(12) United States Patent
Shestak

(10) Patent No.: US 7,699,472 B2
(45) Date of Patent: Apr. 20, 2010

(54) MULTI-VIEW AUTOSTEREOSCOPIC PROJECTION SYSTEM USING SINGLE PROJECTION LENS UNIT

(75) Inventor: Sergey Shestak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1183 days.

(21) Appl. No.: 11/233,009

(22) Filed: Sep. 23, 2005

(65) Prior Publication Data

US 2006/0066810 A1   Mar. 30, 2006

Related U.S. Application Data

(60) Provisional application No. 60/612,504, filed on Sep. 24, 2004.

(51) Int. Cl.
  *G03B 21/22* (2006.01)
  *G03B 21/28* (2006.01)
  *G03B 21/60* (2006.01)
  *G02B 27/22* (2006.01)

(52) U.S. Cl. .................. 353/7; 353/78; 353/99; 353/38; 359/457; 359/458; 359/466

(58) Field of Classification Search ............... 353/7, 353/78, 99, 102, 38; 359/457, 458, 376, 359/378, 462, 466
See application file for complete search history.

(56) References Cited

U.S. PATENT DOCUMENTS

| | | | |
|---|---|---|---|
| 5,614,941 A * | 3/1997 | Hines | 348/42 |
| 6,201,565 B1 * | 3/2001 | Balogh | 348/40 |
| 6,999,071 B2 * | 2/2006 | Balogh | 345/419 |
| 2005/0046795 A1 * | 3/2005 | Toeppen | 353/7 |

* cited by examiner

*Primary Examiner*—Georgia Y Epps
*Assistant Examiner*—Magda Cruz
(74) *Attorney, Agent, or Firm*—Stanzione & Kim, LLP

(57) ABSTRACT

A multi-view autostereoscopic projection system using a single projection lens unit. The projection type autostereoscopic system includes: a source of graphic signals representing at least three perspective views of a 3-D object on at least three parts of a frame, the at least three perspective views being directly or reflectively projected vertically or horizontally in a predetermined order, an image projector connected to the source of graphic signals, an image screen disposed across from the image projector, and first and second parallel plane mirrors installed between a projection lens of the image projector and the image screen to be substantially parallel to a projection axis at the same distance from the projection axis such that the first and second parallel plane mirrors are separated from each other by a predetermined distance.

42 Claims, 12 Drawing Sheets

MULTI-VIEW AUTOSTEREOSCOPIC PROJECTION SYSTEM USING SINGLE PROJECTION LENS UNIT

CROSS-REFERENCE TO RELATED APPLICATIONS

This application claims the benefit of U.S. Provisional Patent Application No. 60/612,504, filed on Sep. 24, 2004, in the U.S. Patent and Trademark Office, the disclosure of which is incorporated herein in its entirety by reference.

BACKGROUND OF THE INVENTION

1. Field of the Invention

The present general inventive concept relates to an autostereoscopic projection system, and more particularly, to an autostereoscopic projection system which can display a multi-view stereoscopic image using a single projection lens unit.

2. Description of the Related Art

An autostereoscopic display having a single projection lens and a single projection cathode ray tube (CRT) is disclosed in U.S. Pat. No. 5,132,839. In the referenced patent, stereoscopic images are displayed sequentially by simultaneously changing a direction of a projection beam. A disadvantage of the autostereoscopic display disclosed in the referenced patent is an influence of persistent image in a high frame rate image projector, and a bulky projection lens. A system employing only one projection panel to display all perspective views is disclosed in U.S. Pat. No. 5,430,474. However, the system of the referenced patent requires usage of more than one projection lens and corresponding illumination systems.

A stereo attachment for projectors and cameras is disclosed in U.S. Pat. No. 2,314,174. A disadvantage of the stereo attachment disclosed in U.S. Pat. No. 2,314,174, lies in a certain level of keystone distortion of images projected by the stereo attachment. Perspective images are not focused properly onto an entire screen area due to the keystone distortion. This disadvantage leads to more complicated problems if the same technique is applied in a compact stereoscopic or an autostereoscopic display employing a wide angle image projection.

FIG. 1 illustrates a conventional stereoscopic system employing a single projection lens in accordance with U.S. Pat. No. 2,314,174. The conventional stereoscopic system is used for stereoscopic cinema projection. Referring to FIG. 1, two adjacent perspective images recorded on a transparency 11 are simultaneously projected through a common projection lens 12 onto a screen 13. A mirrored prism 14, which is mounted near the projection lens 12, dissects a projection beam received from the projection lens 12 into two equal parts as partial beams, each of which is then reflected by a corresponding mirror 15 toward a corresponding polarizing filter 16. An angle of inclination of the mirrors 15 can be adjusted to converge image halves onto the screen 13. The two partial beams are perpendicularly polarized by the two corresponding polarizing filters 16. The two partial beams may be projected to a region 19 outside the screen 13 according to the angles of inclination of the corresponding mirrors 15.

If the corresponding mirrors 15 are parallel to facets of the prism 14, the two perspective images arriving at the region outside the screen 19 are focused without any distortion. However, the two perspective images are also separated from each other in a vertical direction when the corresponding mirrors 15 are parallel to the facets of the prism 14. For comfortable stereoscopic viewing, the vertical separation between the two perspective images should be minimized, which can be achieved by converging the two perspective images on a central part of the screen 13. To converge the two perspective images on the central part of the screen 13, the corresponding mirrors 15 should be declined at a certain angle, that is, about one-fourth of a projection angle. The projection angle is the angle at which the projection beam is projected by the projection lens 12. As a result, two images 17, which arrive at the screen 13, are unequally distorted and defocused everywhere except for one horizontal line on the central part of the screen 13.

The distortion of the two images 17 may be characterized as keystone distortion of different signs that produces undesirable perspective distortion of stereoscopic images. The greater the projection angle, the more distortion and defocusing that occurs in the two images 17. That is, the distortion and defocusing that occurs in compact types of stereoscopic and autostereoscopic displays like desktop, kiosk etc., which employ a wide projection angle is typically much greater than in cinema projection. Yet another disadvantage of the conventional stereoscopic system is that it cannot be used for a multi-view autostereoscopic application.

Additionally, stereoscopic images are typically viewed through polarizing eyeglasses 18. A similar beam splitting projection system that uses a special screen for the autostereoscopic projection may be employed instead of the polarizing eyeglasses 18. However, it is difficult to manufacture this beam splitting projection system used for the autostereoscopic projection.

SUMMARY OF THE INVENTION

The present general inventive concept provides a multi-view autostereoscopic projection system with split projection beams, which can be used for a desktop, a real projection stereoscopic display, and/or any other application having a short projection distance to eliminate unwanted distortion, to provide perfect focus of a projected image on an entire screen, and to display a stereoscopic image using a single projection lens.

The present general inventive concept also provides a projection type autostereoscopic system, which can eliminate unwanted distortion in a single lens autostereoscopic projection system using split projection beams in applications including a desktop and/or a kiosk type rear projection stereoscopic display or any other application having a short projection distance.

The present general inventive concept also provides a projection type autostereoscopic system, which can provide perfect focus of a projected image on an entire screen.

The present general inventive concept also provides a projection type autostereoscopic system, which can provide multi-view autostereoscopic operation based on a single projection lens without requiring a viewer to wear eyeglasses.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a projection type autostereoscopic system, comprising a source of graphic signals representing at least three perspective views of a 3-D object on at least three parts of a frame, the at least three perspective views being directly or reflectively projected horizontally or vertically in a predetermined order; an image projector connected to the source of graphic signals; an image screen disposed across from the image projector; and first and second parallel plane mirrors installed between a projection lens of the image projector and the image screen to be substantially parallel to a projection axis at the same distance from the projection axis such that the first and second parallel plane mirrors are separated from each other by a predetermined distance.

The first and second plane mirrors may be placed along a vertical direction of the image screen and the source of graphic signals provides a signal that represents a frame and is divided into 2n+1 equal parts where 2n+1 represents a desired number of viewing zones and n is any positive integer, and the divided parts of the signal are arranged along a horizontal direction of the image screen, each of which displays different perspective images in order of increasing number and even ones of the perspective images are reflected along the horizontal direction by the first and second plane mirrors with respect to odd ones of the perspective images.

The first and second plane mirrors may be placed along a horizontal direction of the image screen and the source of graphic signals provides a signal that represents a frame and is divided into 2m+1 equal parts where 2m+1 represents a desired number of viewing zones and m is any positive integer, and the divided parts of the signal are arranged along a vertical direction of the image screen, each of which displays different perspective images in order of increasing number and even ones of the perspective images are reflected along the vertical direction by the first and second plane mirrors with respect to odd ones of the perspective images.

The foregoing and/or other aspects of the present general inventive concept may also be achieved by providing an autostereoscopic projection system, comprising a screen, an image projector to simultaneously project at least three perspective views constituting a frame arranged in a direction, and a mirror unit disposed between the screen and the image projector to directly and reflectively project according to a location of each of the at least three perspective views with respect to a center of the frame.

The foregoing and/or other aspects of the present general inventive concept may also be achieved by providing an autostereoscopic projection system, comprising a screen, an image projector to project first, second, and third perspective views of a frame, and a mirror unit fixedly disposed between the screen and the image projector to simultaneously direct all of the first, second, and third perspective views toward the screen.

The foregoing and/or other aspects of the present general inventive concept may also be achieved by providing an autostereoscopic projection system, comprising a screen, an image projector to project a plurality of partial beams of an image toward the screen, a first reflector and a second reflector disposed in parallel with each other and extending between the image projector and the screen to reflect the plurality of partial beams of the image to the screen to create a plurality of corresponding viewing zones at which the image is viewable in three dimensions.

The foregoing and/or other aspects and advantages of the present general inventive concept may also be achieved by providing a projection system, comprising a pair of parallel mirrors arranged along a projection axis to receive partial projection beams of an image along the projection axis and to reflect the partial projection beams one or more times along the projection axis, and a single lens structure disposed at an end of the pair of parallel mirrors to provide a plurality of views of a three dimensional object that are viewable without special glasses.

The foregoing and/or other aspects of the present general inventive concept may also be achieved by providing a screen usable with an autostereoscopic projection system, the screen comprising at least one lenticular lens sheet having a plurality of lenticular lenses disposed at a predetermined angle to receive a plurality of perspective images from an image projector and to form a plurality of corresponding viewing zones therefrom such that the plurality of corresponding viewing zones continuously cover a 3-D viewing area.

The foregoing and/or other aspects of the present general inventive concept may also be achieved by providing a method of forming stereoscopic vision areas performed by an autostereoscopic projection system, the method comprising projecting a plurality of partial beams of an image toward a screen, and reflecting the plurality of partial beams of the image from a first reflector and a second reflector disposed in parallel with each other and extending toward the screen to create a plurality of corresponding viewing zones at which the image is viewable in three dimensions.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
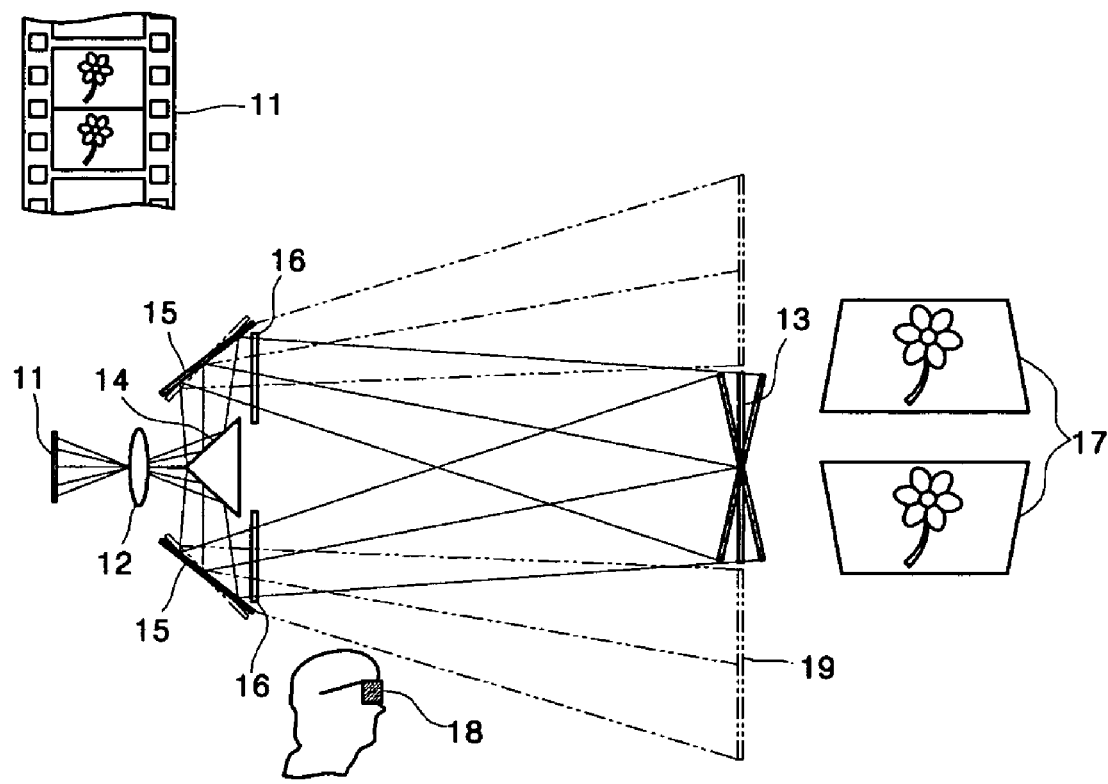
FIG. 1 is a view illustrating a conventional stereoscopic projection system.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2A:
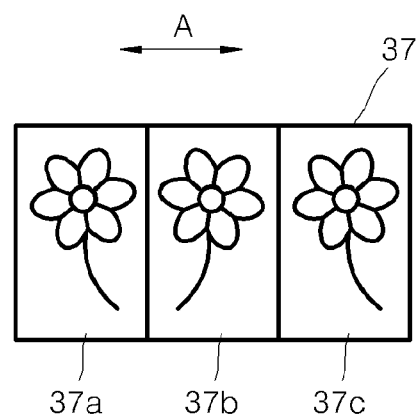
FIG. 2A is a view illustrating image frames provided to an autostereoscopic projection system according to an embodiment of the present general inventive concept.
Figure 2B:
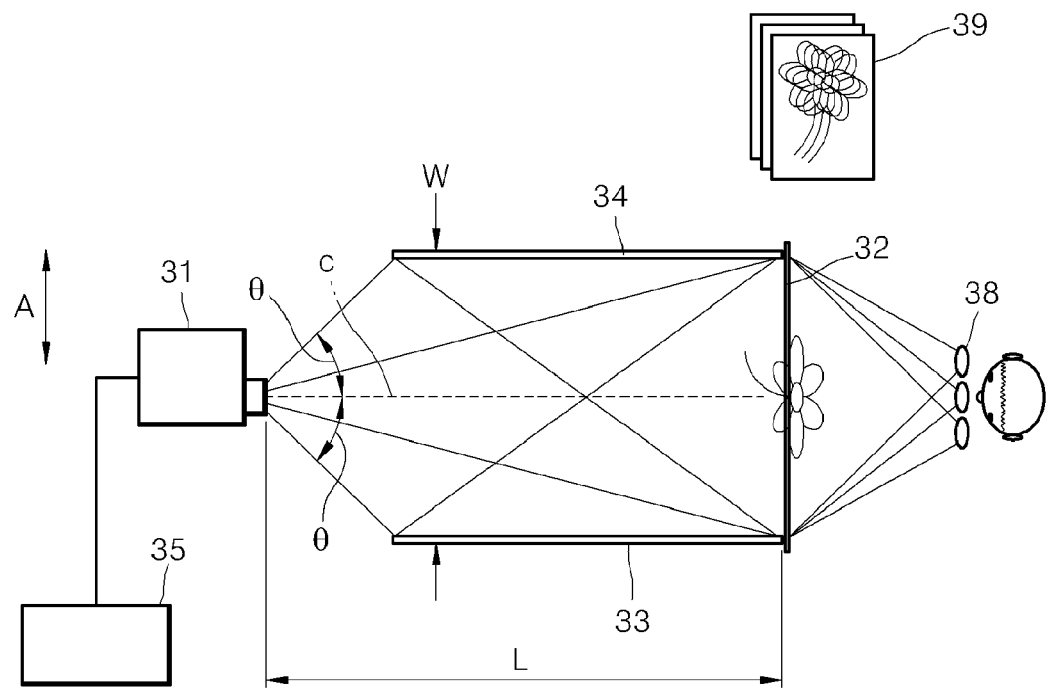
FIG. 2B illustrates an autostereoscopic projection system according to an embodiment of the present general inventive concept.

FIG. 2A is a view illustrating image frames provided to an autostereoscopic projection system according to an embodiment of the present general inventive concept, and FIG. 2B illustrates the autostereoscopic projection system according to an embodiment of the present general inventive concept. FIG. 2B illustrates an optical layout of a three-view autostereoscopic projection system including an image projector 31 to transmit a projection beam toward a screen 32, and first and second plane mirrors 33 and 34 disposed between the image projector 31 and the screen 32. The screen 32 comprises a pupil forming screen.

The image projector 31 may be various types of image projectors applied in accordance with the present general inventive concept. For example, the image projector 31 may be controlled by electrical signals, such as a liquid crystal display (LCD), a digital mirror device (DMD), or the like. Additionally, a film projector or slide projector can be used as the image projector 31. A source of graphic signals 35, for example, a computer with a graphic interface, generates an electric signal to represent a frame 37 according to a standard supported by the image projector 31 and provides the electrical signal to the image projector 31. As illustrated in FIG. 2A, the frame 37 is divided into three equal parts 37a, 37b, and 37c in a horizontal (row) direction (A), each of which is dedicated to one of three perspective images (views).

The first and second plane mirrors 33 and 34 are parallel to each other. A horizontal projection angle θ of the image projector 31, a distance "W" between the first and second plane mirrors 33 and 34, and a projection distance "L" between the image projector 31 and the screen 32 satisfy the following relationship.

$$\frac{3}{2}\left(\frac{W}{L}\right) = \tan\theta \quad (1)$$

The first and second plane mirrors 33 and 34 extend vertically along a projection axis (c) perpendicular to the horizontal direction (A) and are spaced horizontally apart from the projection axis (c) of the image projector 31 and are parallel to each other. The first and second plane mirrors 33 and 34 are also symmetrical with respect to the projection axis (c) of the image projector 31. The screen 32 is perpendicular to the projection axis (c) of the image projector 31, and is disposed to face the image projector 31 with respect to the first and second plane mirrors 33 and 34 extending therebetween. The screen 32 forms viewing zones 38 at an exit pupil of the screen 32, that is, an observation distance of the autostereoscopic projection system. The autostereoscopic projection system illustrated in FIG. 2B produces a proper convergence of perspective images 39.

Figure 3:
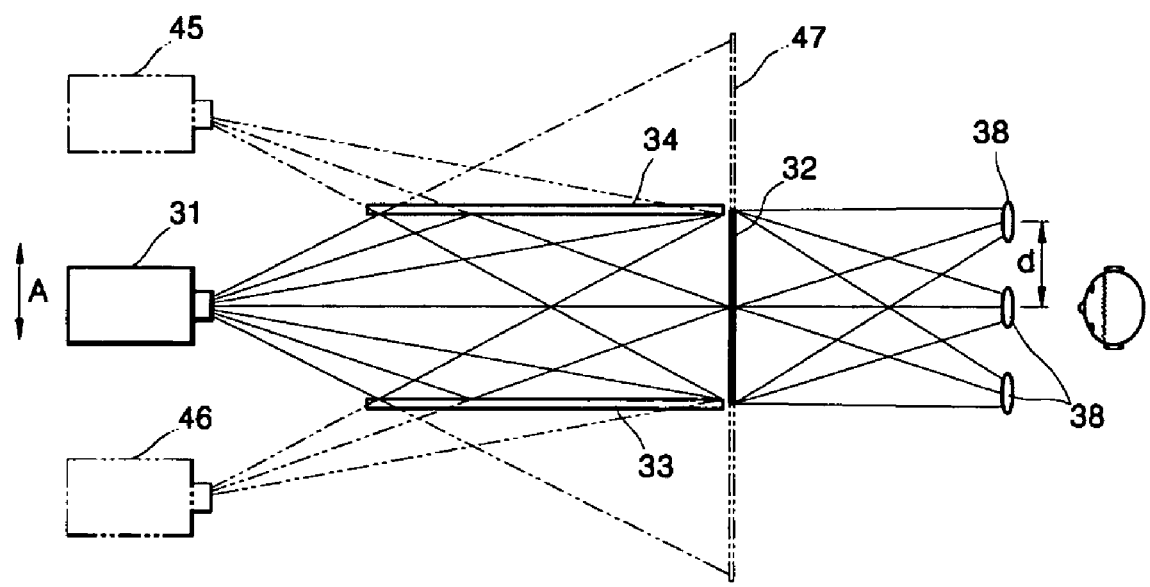
FIG. 3 is a view illustrating an operation of the autostereoscopic projection system of FIG. 2B to form multi-view images according to another embodiment of the present general inventive concept.

FIG. 3 is a view illustrating an operation of the autostereoscopic projection system of FIG. 2B to form multi-view images according to another embodiment of the present general inventive concept. Referring to FIG. 3, the first and second plane mirrors 33 and 34 create two virtual images 45 and 46 of the image projector 31. These virtual images 45 and 46 are situated symmetrically to the left and to the right of the projection axis (c) in the horizontal direction (A) of the image projector 31 at a distance that is equal to the distance "W" between the plane mirrors 33 and 34. That is, the virtual images 45 and 46 are spaced apart from the image projector 31 by the distance "W" in opposite directions. Three projectors including one real projector (i.e., the image projector 31) and two virtual projectors 45 and 46 (virtual projectors) each send one third of a projection beam toward the screen 32. Each of the thirds of the projection beam carries mostly one of the perspective images. A central perspective image hits the screen 32 directly without reflection, and the other two perspective images are projected onto the same screen 32 after being reflected by the mirrors 33 and 34. In order to provide the proper convergence of the three perspective images 39 (see FIG. 2B) on the screen 32, the left and right perspective images, which correspond to left and right frames 37a and 37c of the frame 37 illustrated in FIG. 2A, should be projected after being linearly reflected along the horizontal direction (A). In other words, as illustrated in FIG. 3, the perspective images are displayed in order of increasing number and even perspective images are reflected along the horizontal direction (A) with respect to odd perspective images. We assume here that the image projector 31 is made substantially to project an image on a plane screen and that the image can be properly focused using a focusing mechanism on an entire screen area 47 (i.e., a large screen) represented by dashed lines. If an unfold image can be properly focused on the entire screen area 47 (i.e., the large screen), each of the three perspective images is also properly focused on a smaller screen, which corresponds to the screen 32.

As illustrated in FIG. 3, the three perspective images are projected on the same screen 32 by the three laterally distributed projectors 31, 45, and 46 that are arranged along the horizontal direction (A) of the screen 32. An element of autostereoscopic technology is the pupil forming screen (i.e., the screen 32), which is a screen that is capable of creating an image of a projection lens to serve as an exit pupil of an autostereoscopic projection system. In other words, the screen 32 forms one or more viewing zones. The screen 32 may include a positive lens.

Referring to FIGS. 2B and 3, the lens of the screen 32 creates three viewing zones 38 to correspond to each of the perspective images. A Fresnel lens may be used as the screen 32 instead of an ordinary lens in order to reduce a weight of a large screen and a cost of a display.

A focal length "F" of the lens of the screen 32 can be chosen according to the following relationship.

$$d = \frac{W}{\left(\frac{L}{F}\right) - 1} \quad (2)$$

where "d" represents a desired separation distance between the viewing zones 38 (i.e., a viewing zone distance), "L" represents the projection distance between the image projector 31 and the screen 32, "W" represents the distance between the first and second plane mirrors 33 and 34, and "F" represents the focal length of the lens of the screen 32. "d" can be chosen to be equal or less than an average inter-ocular distance, such as 65 mm.

Figure 4A:
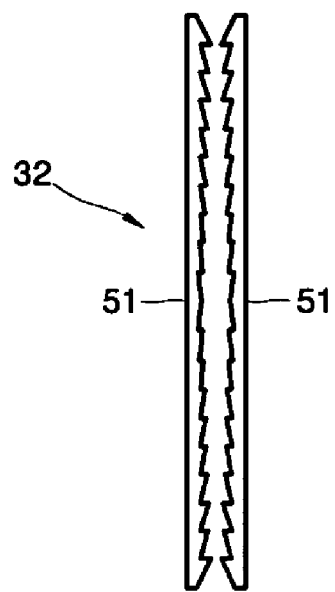
FIGS. 4A, 4B, 4C, and 4D illustrate various types of screens usable in the autostereoscopic projection system of FIGS. 2B and/or 3 according to various embodiments of the present general inventive concept.
Figure 4B:
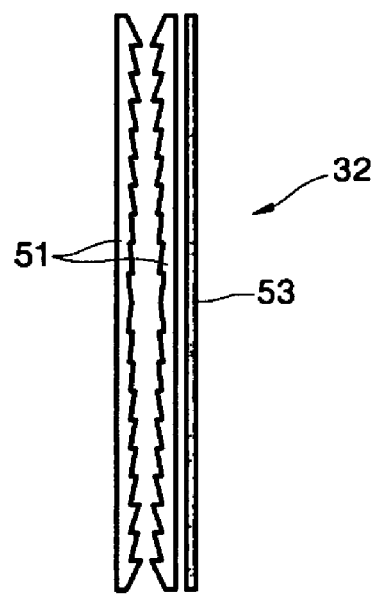
Figure 4C:
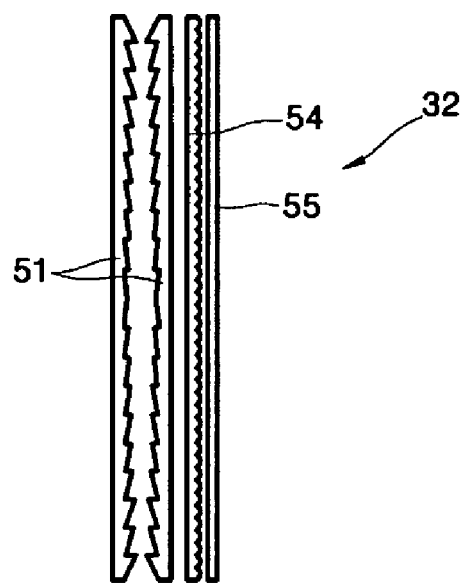
Figure 5:
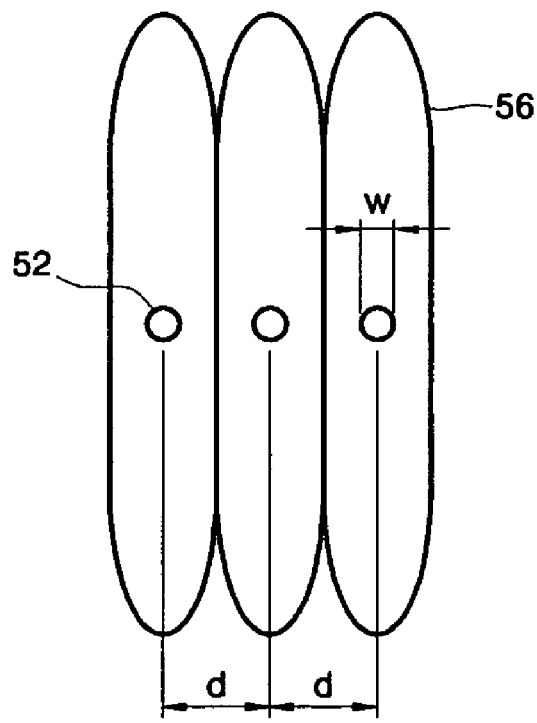
FIG. 5 illustrates viewing zones formed by the autostereoscopic projection system of FIGS. 2B and/or 3 and extended by a diffuser according to an embodiment of the present general inventive concept.
Figure 6:
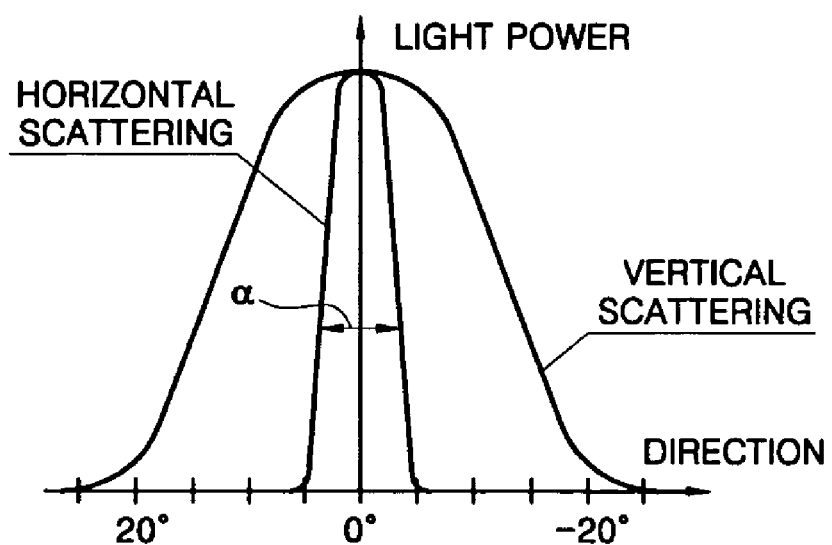
FIG. 6 illustrates light power of vertical scattering and horizontal scattering of a diffuser employed by the autostereoscopic projection system of FIGS. 2B and/or 3 according to an embodiment of the present general inventive concept.

FIGS. 4A, 4B, 4C, and 4D illustrate various lens screen types usable as the screen 32 according to various embodiments of the present general inventive concept. FIG. 5 illustrates viewing zones 52 formed by the autostereoscopic projection system of FIGS. 2B and/or 3 and extended by a diffuser according to an embodiment of the present general inventive concept. FIG. 6 illustrates light power of vertical scattering and horizontal scattering of a diffuser employed by the autostereoscopic projection system of FIGS. 2B and/or 3. The simplest lens screen type used for the screen 32 is illustrated in FIG. 4A and includes two Fresnel lenses 51 in order to reduce aberrations. Alternatively, a single Fresnel lens may be used as the screen 32. Referring to FIG. 5, when the screen 32 comprises one or two Fresnel lenses 51 to create viewing zones 52 that are separated by the separation distance "d", a viewing zone size "w" of each of the viewing zones 52 can be calculated using the following relationship.

$$w = \frac{D}{\left(\frac{L}{F}\right) - 1} \quad (3)$$

where "D" represents a size of an opening of the lens screen of the screen 32, "L" represents the projection distance between the image projector 31 and the screen 32, and "F" represents the focal length of the lens of the screen 32.

The opening size "D" may be much smaller than the distance "W" between the two plane mirrors 33 and 34, which is equal to a screen size. As a result, the viewing zone size "w" may be much smaller than the separation distance "d" between left and central viewing zones 52 and between right and central viewing zones 52. Thus, viewers may not have freedom to move their heads from a position of best viewing. In order to provide the viewer with some freedom to move their head, at least one more layer may be added to the screen 32. The added layer can be either a directional diffuser 53 (i.e., a light shaping diffuser) as illustrated in FIG. 4B, or lens-sheets 54 and 55 as illustrated in FIG. 4C. The directional diffuser 53 can be a directional diffuser produced by Physical Optical Corporation under the trademark LSD. Additionally, the directional diffuser 53 can be an elliptical light shaping diffuser.

As illustrated in FIG. 6, the directional diffuser 53 can be characterized by different angles of diffusion in two orthogonal directions (e.g., the horizontal direction (A) and a vertical direction). In the present embodiment, the directional diffuser 53 can be chosen to have a limited angle of diffusion in a horizontal plane and a maximum angle of diffusion in a vertical plane. An angle of diffusion "α" in the horizontal plane can be estimated using the following relationship.

$$\alpha \approx \frac{D(L-F)}{LF} \quad (4)$$

where "D" represents the size of the opening of the lens of the screen 32, "L" represents the projection distance between the image projector 31 and the screen 32, and "F" represents the focal length of the lens of the screen 32.

The smaller the opening size of the screen 32 of the image projector 31, the more precise the estimation of the angle of diffusion "α" in the horizontal plane.

As illustrated in FIG. 5, the directional diffuser 53, which is chosen in accordance with the above relationships, extends the viewing zones 52 (i.e., the view zones 38 in FIGS. 2B and 3) in the horizontal direction (A) to fill gaps therebetween while avoiding crosstalk between the extended viewing zones. The extension of the viewing zones 52 in the vertical direction may have a limitation of conserving brightness of the image. That is, the wider light is spread in the vertical direction, the weaker the brightness of the image. As a result of using the directional diffuser 53, a wide area of stereoscopic vision 56 (see FIG. 5) including three extended viewing zones can be obtained. Inside this wide area of stereoscopic vision 56, the viewer can move their head without losing the stereoscopic vision and can view the image even without experiencing any motion parallax switching between the view through the extended left and central viewing zones and the view through the extended central and right viewing zones.

A combination of two lenticular lens sheets having a pitch "p" that is much smaller than an image resolution may be used as an alternative to the directional diffuser 53. First lenticular lenses (not shown), which are arranged horizontally, may be attached to one surface of a lens sheet, and second lenticular lenses (not shown), which are arranged vertically, may be attached to the other surface of the lens sheet. The first lenticular lenses spread light in the vertical direction, and the second lenticular lenses spread light in the horizontal direction (A). The pitch "p" and a focal length "f" of the lenticular lenses of the second lenticular lenses (i.e., vertical lenticular lenses) can be chosen from the following relationship in order to produce a desired angle of diffusion "α".

$$\alpha = 2\tan^{-1}\left(\frac{p}{2f}\right) \quad (5)$$

where "p" represents the pitch of the lenticular lenses of the first and second lenticular lenses and "f" represents a focal length of the lenticular lenses.

The first lenticular lenses can be chosen from commercially available polygraphic lenticular lens sheets (i.e., horizontal lenticular lenses) to have a pitch size of about 0.2 mm capable of spreading light within an angle of about 20 to 30 degrees.

Figure 4D:
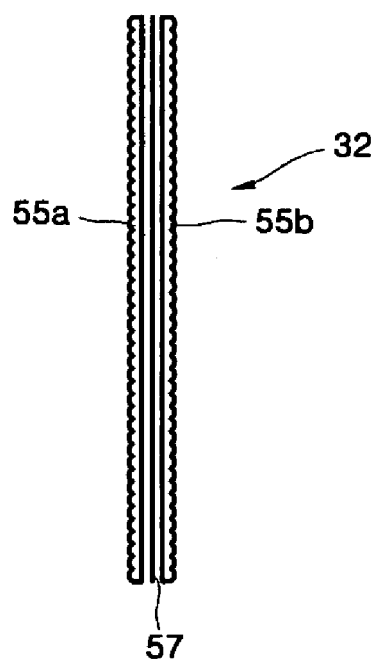

As illustrated in FIG. 4D, another screen 32 can be used with the autostereoscopic projection system of FIGS. 2B and/or 3. The screen 32 illustrated in FIG. 4D may include first and second lenticular lens sheets 55a and 55b having vertical lenticular lenses and a thin diffuse layer 57 disposed between the two lenticular lens sheets 55a and 55b. The first and second lenticular lens sheets 55a and 55b are mounted on a flat surface at double focal distances. The screen 32 of FIG. 4D produces multiple viewing zones (not shown) at a distance that is equal to the projection distance "L" between the image projector 31 and the screen 32, and spreads light in the horizontal direction (A).

Figure 7:
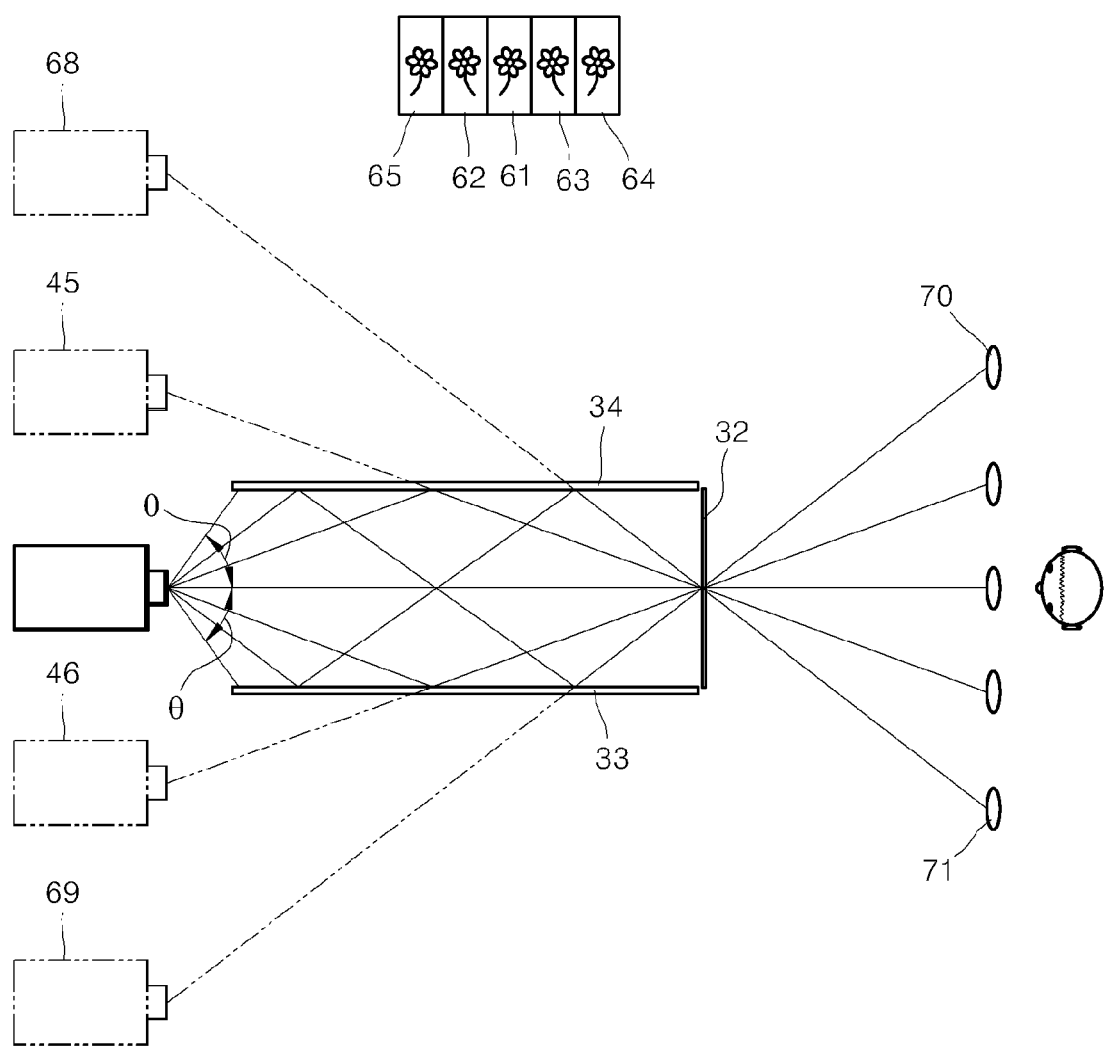
FIG. 7 is a plan view illustrating a five view autostereoscopic projection system with multiple reflections according to another embodiment of the present general inventive concept.

The three-view autostereoscopic projection system of FIGS. 2B and 3 employs a single reflection of the side views of the perspective images by the corresponding first and second plane mirrors 33 and 34. More parallax views of the perspective images can be displayed by using multiple reflections. FIG. 7 is a plan view illustrating a five view autostereoscopic projection system using multiple reflections according to another embodiment of the present general inventive concept. For simplification purposes, only a central beam of each perspective image is illustrated by dashed lines shown in FIG. 7. Two perspective images 62 and 63, which are positioned in a frame next to a central perspective image 61, experience a single reflection by the corresponding first and second plane mirrors 33 and 34. Two other perspective images 64 and 65, positioned at edges of the frame outside of the perspective images 62 and 63, experience two reflections by the corresponding first and second plane mirrors 33 and 34. The central perspective image 61 is projected to the screen 32 without being reflected by the first and second plane mirrors 33 and 34. As a result of the two reflections, two or more virtual image projectors 69 and 68 and two or more corresponding viewing zones 70 and 71 are obtained. Parameters of projection geometry can be chosen in accordance with the following relationship, which is more general than relationship (1).

$$\frac{2n+1}{2}\frac{W}{L} = \tan\vartheta \tag{6}$$

where "2n+1" represents a desired number of viewing zones (i.e., for perspective images) (for n=1, 2, 3 . . . ), "W" represents the distance between the first and second plane mirrors 33 and 34, and "L" represents the projection distance between an image projector and the screen 32. As illustrated in FIG. 7, the viewing zones 70 and 71 can be arranged to extend beyond a dimension of the screen 32.

Figure 8:
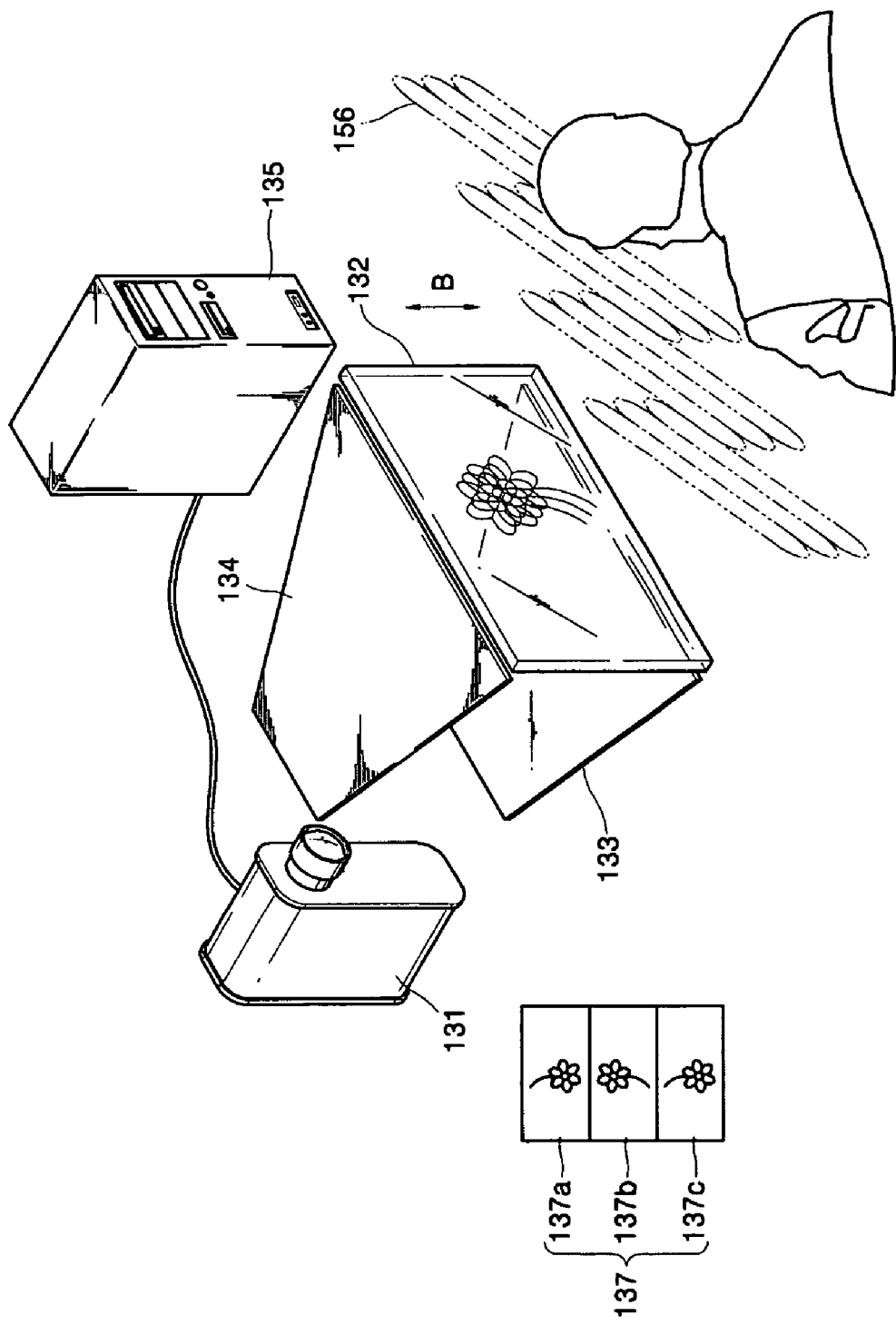
FIG. 8 is a perspective view illustrating an autostereoscopic projection system according to another embodiment of the present general inventive concept.

FIG. 8 is a perspective view illustrating an autostereoscopic projection system according to another embodiment of the present general inventive concept. Referring to FIG. 8, the autostereoscopic projection system includes a projector 131 and first and second plane mirrors 133 and 134. The first and second plane mirrors 133 and 134 are perpendicular to a vertical direction (B) of a screen 132 to be parallel to each other along a horizontal direction of the screen 132. A graphic signal is transmitted to the projector 131 from a source 135 of graphic signals, such as a computer. The graphic signal may be an electrical signal representing a frame 137 in accordance with a standard that is supported by the projector 131. The frame 137 includes an intermediate image frame 137b, an upper image frame 137a, and a lower image frame 137c. The upper and lower image frames 137a and 137c are vertically arranged in the vertical direction (B) of the screen 132. The upper and lower image frames 137a and 137c include vertically reflected images with respect to the intermediate image frame 137b.

Figure 9:
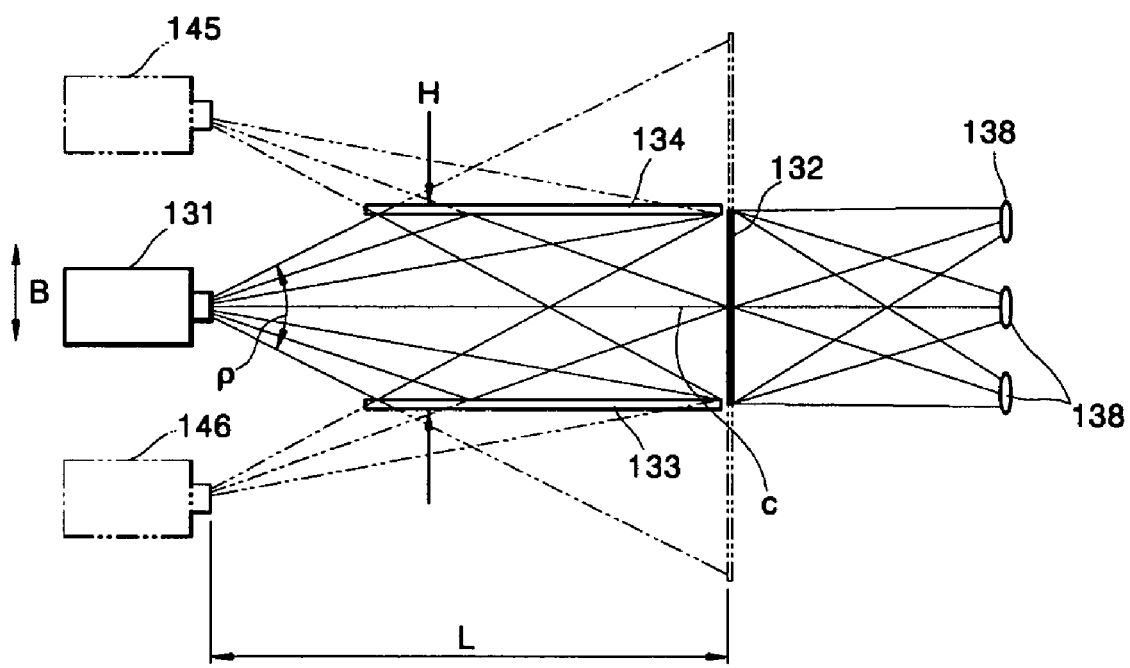
FIG. 9 is a side view illustrating the autostereoscopic projection system of FIG. 8.

FIG. 9 is a side view illustrating the autostereoscopic projection system of FIG. 8. Referring to FIG. 9, the first and second plane mirrors 133 and 134 create two virtual images of the projector 131. First and second virtual projectors 145 and 146 form the virtual images and are situated symmetrically on upper and lower sides of a projection axis (c) with respect to the vertical direction (B) of the projector 131 (i.e., the real projector) at a distance that is equal to a distance "H" between the first and second plane mirrors 133 and 134. The three projectors including the projector 131 and the first and second virtual projectors 145 and 146, which are arranged in the vertical direction (B), each transmit one third of a projection beam to the screen 132. While an intermediate image created by the projector 131 is directly projected to the screen 132 without reflection, perspective images created by the first and second virtual projectors 145 and 146 are reflected by the first and second plane mirrors 133 and 134 to the screen 132 to form viewing zones 138.

Figure 10:
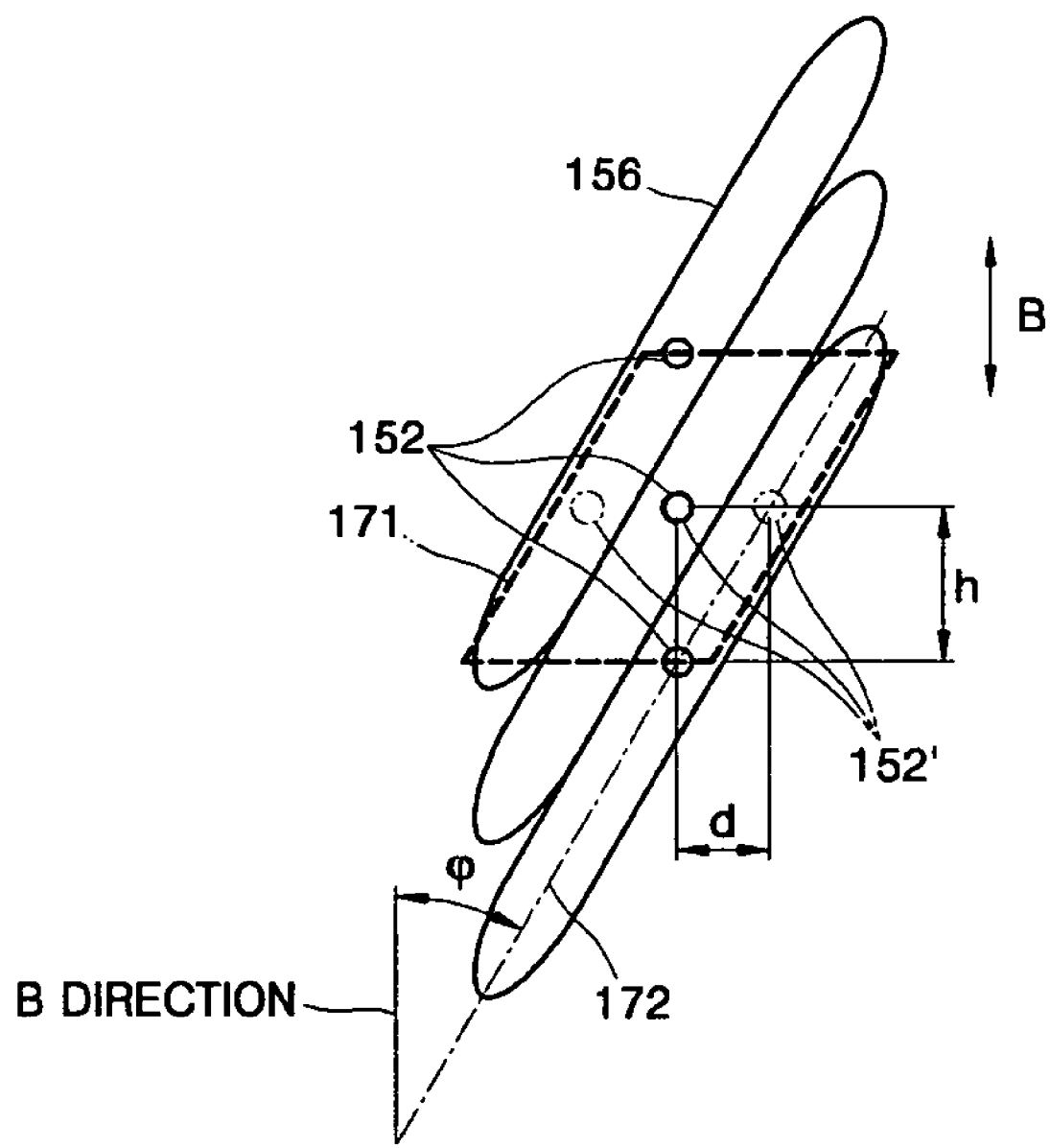
FIG. 10 illustrates viewing zones created by the autostereoscopic projection system of FIG. 8 according to an embodiment of the present general inventive concept.

As illustrated in FIG. 10, if the screen 132 includes a positive lens, viewing zones 152 (i.e., the viewing zones 138 in FIG. 9) are separated in the vertical direction (B) by a viewing zone distance "h". In other words, the vertical viewing zones 152 are not slanted, and are separated by the viewing zone distance "h". In this case, the following relationship is satisfied.

$$h = \frac{H}{\left(\frac{L}{F}\right) - 1} \tag{7}$$

Referring to FIG. 9, "H" represents the vertical distance between the first and second mirrors 133 and 134 and a vertical size of the screen 132, "L" represents a projection distance between the projector 131 and the screen 132, and "F" represents a focal length of the positive lens of the screen 132. The source 135 of the graphic signals produces the frame 137 with three perspective images arranged in the vertical (column) direction (B). The frame 137 is divided into the three frames 137a, 137b, and 137c in the vertical direction (B) of the screen 132, and each of the three frames 137a, 137b, and 137c includes one perspective view having a corresponding perspective image. The upper and lower frames 137a and 137c are reflected in the vertical direction (B) with respect to the intermediate frame 137b. In other words, the perspective images are displayed in order of increasing number and even perspective images are reflected along the vertical direction (B) with respect to odd perspective images. Dimensions of the autostereoscopic projection system of FIG. 9 may be rearranged such that the viewing zones 138 extend beyond the screen 132 in a similar manner as illustrated in FIG. 7. For example, the dimensions may be selected such that reflected beams pass through a center of the screen 132, as illustrated in FIG. 7. As illustrated in FIG. 9, the autostereoscopic projection system may include an extended screen that corresponds to a projection angle "ρ."

In the present embodiment, since viewing zones of the first and second virtual projectors 145 and 146 are arranged in a column, i.e., in the vertical direction (B) of the screen 132, the vertical arrangement of the first and second virtual projectors 145 and 146 may be transformed into a horizontal arrangement of viewing zones. In the present embodiment, a directional light diffuser having slanted geometry may be introduced to transform the vertical arrangement of the first and second virtual projectors 145 and 146 into the horizontal arrangement of viewing zones. This method of transformation is effective when the viewing zone distance "h" (see FIG. 10) is equal to or greater than a desired horizontal viewing zone distance "d". Here, the horizontal viewing zone distance "d" represents the distance between horizontal viewing zones 152' when the vertical viewing zones 152 are transformed into the horizontal viewing zones 152'.

As illustrated in FIG. 10, the directional light diffuser, which has a maximum light scattering axis 172 that is slanted with respect to the vertical direction (B) at an angle "φ," creates a certain area 171 in which the arrangement of viewing zones 152' is horizontal. The angle "φ" can be calculated from the following relationship. The directional light diffuser is explained below with reference to FIG. 12.

$$\tan\varphi = \frac{dH}{\left(\frac{L}{F}\right) - 1} \tag{8}$$

where "d" represents the desired horizontal viewing zone distance between the viewing zones 152', "L" represents the projection distance (see FIG. 9), "F" represents the focal length of a lens of the screen 132, and "H" represents the vertical distance between the first and second plane mirrors 133 and 134 (see FIG. 9). The directional light diffuser provides a stereoscopic vision 156.

Figure 11:
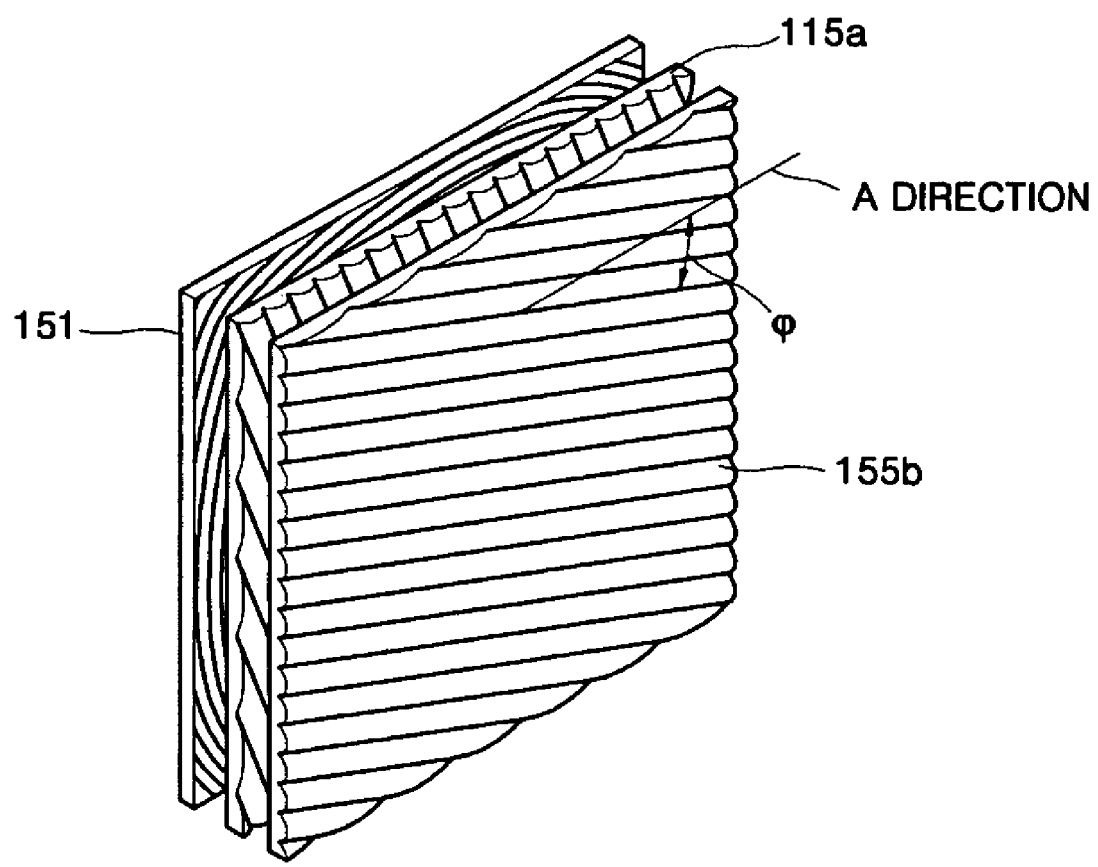
FIGS. 11 and 12 are perspective views illustrating screens usable in the autostereoscopic projection system of FIG. 8 according to various embodiments of the present general inventive concept.

FIG. 11 is a perspective view illustrating a screen usable as the screen 132 of the autostereoscopic projection system according to an embodiment of the present general inventive concept. The screen includes a Fresnel lens 151 and first and second lenticular lens sheets 115a and 155b. The first and second lenticular lens sheets 115a and 155b are both arranged at 90 degrees. In this screen, the lenticular lenses in each of the first and second lenticular lens sheets 115a and 155b, which provide a wide angle to spread light, can be slanted at the same angle "φ" with respect to the horizontal direction (A) of FIG. 3, for example.

Figure 12:
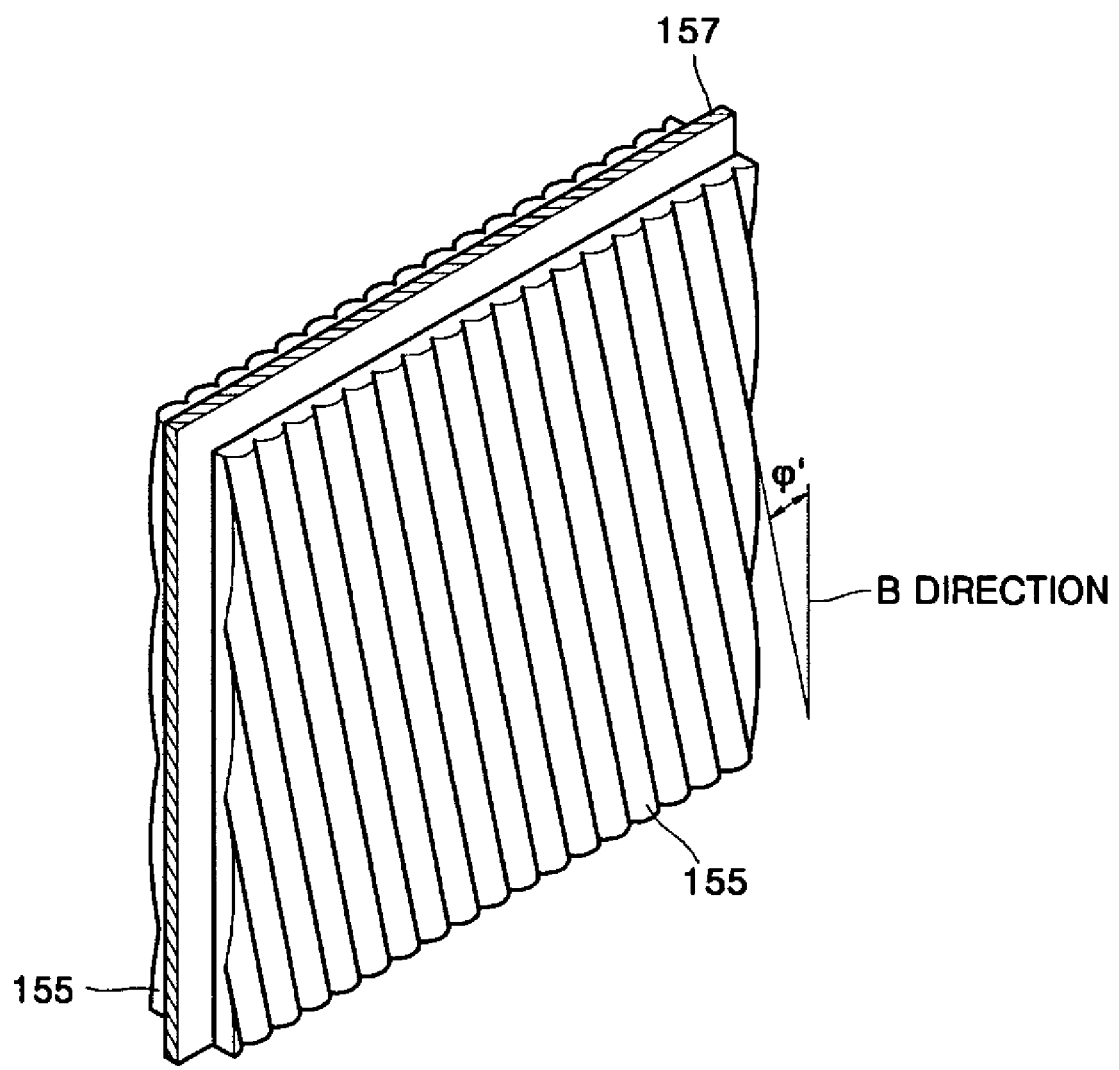

FIG. 12 is a perspective view illustrating another screen usable as the screen 132 of the autostereoscopic projection system. The screen includes first and second confocal lenticular lens sheets 155 and a diffuse layer 157 interposed between the first and second confocal lenticular lens sheets 155. In this screen, an angle "φ'" between a direction in which lenticular lenses of the first and second confocal lenticular lens sheets 155 are arranged and the vertical direction (B) satisfies the following relationship.

$$\tan\varphi = \frac{d}{H} \quad (9)$$

where "d" represents the horizontal viewing zone distance (see FIG. 10) and "H" represents the vertical distance between the first and second plane mirrors 133 and 134 (see FIG. 9).

The three-view autostereoscopic projection system of the present embodiment, which is illustrated in FIGS. 8 through 12, uses a single reflection by the first and second plane mirrors 133 and 134. More parallax views may be displayed using multiple reflections from the first and second plane mirrors 133 and 134. For example, a five-view autostereoscopic projection system may be realized using multiple reflections from the first and second plane mirrors 133 and 134. As a result of using the multiple reflections, two or more virtual projectors and two or more corresponding viewing zones may be obtained.

Additionally, the multi-view autostereoscopic projection system having a horizontal arrangement of the first and second plane mirrors 133 and 134 according to the present embodiment can be made using multiple reflections of the image between the first and second plane mirrors 133 and 134, as disclosed above in the previous embodiments. Parameters of projection geometry can be chosen in accordance with the following relationship $$\frac{2m+1}{2}\left(\frac{H}{L}\right) = \tan\rho \quad (10)$$

where m=1, 2, 3 . . . , "2m+1" represents a desired number of viewing zones (i.e., for perspective images), "ρ" represents a vertical projection angle at which the projector 131 projects a beam (see FIG. 9), and "L" represents the projection distance between the projector 131 and the screen 132.

The present general inventive concept can provide a stereoscopic image having a desired number of multiple views and/or viewing zones at desired positions using a single projector. Additionally, distortion and aberration can be minimized by forming multiple views using a single pair of parallel mirrors. Furthermore, the stereoscopic image can be seen without wearing special eyeglasses.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection type autostereoscopic system, comprising:
   a source of graphic signals representing at least three perspective views of a 3D object on at least three parts of a frame, the at least three perspective views being directly or reflectively projected horizontally or vertically in a predetermined order to form at least three corresponding perspective images;
   an image projector connected to the source of graphic signals;
   an image screen disposed across from the image projector; and
   first and second parallel plane mirrors installed between a projection lens of the image projector and the image screen to be substantially parallel to a projection axis at the same distance from the projection axis such that the first and second parallel plane mirrors are separated from each other by a predetermined distance.

2. The projection type autostereoscopic system of claim 1, wherein:
   the first and second plane mirrors are placed along a vertical direction of the image screen;
   the source of graphic signals provides a signal that represents the frame; and
   the at least three perspective views comprise 2n+1 equal parts where 2n+1 represents a desired number of viewing zones and n is any positive integer, and the 2n+1 equal parts of the signal are arranged along a horizontal direction of the image screen, each of which displays different perspective images in order of increasing number and even ones of the at least three perspective images are reflected along the horizontal direction by the first and second plane mirrors with respect to odd ones of the at least three perspective images.

3. The projection type autostereoscopic system of claim 2, wherein a distance (W) between the first and second parallel plane mirrors, a distance (L) between the image projector and the image screen, and a horizontal projection angle (φ) of the image projector satisfy the following relationship to create (2n+1) viewing zones where n is equal to any positive integer $$\frac{(2n+1)}{2}\frac{W}{L} = \tan\vartheta.$$

4. The projection type autostereoscopic system of claim 1, wherein:
   the first and second plane mirrors are placed along a horizontal direction of the image screen;
   the source of graphic signals provides a signal that represents the frame; and
   the at least three perspective views comprise 2m+1 equal parts where 2m+1 represents a desired number of viewing zones and m is any positive integer, and the 2m+1 equal parts of the signal are arranged along a vertical direction of the image screen, each of which displays different perspective images in order of increasing number and even ones of the at least three perspective images are reflected along the vertical direction by the first and second plane mirrors with respect to odd ones of the at least three perspective images.

5. The projection type autostereoscopic system of claim 4, wherein the image screen comprises at least one Fresnel lens and at least one lenticular lens sheet arranged with the at least one Fresnel lens, and a lenticular direction of the lenticular lens sheet is slanted with respect to the vertical direction of the image screen at a predetermined angle.

6. The projection type autostereoscopic system of claim 4, wherein the image screen comprises a Fresnel lens, a first lenticular lens sheet arranged with the Fresnel lens and having a first lenticular direction that is slanted with respect to the horizontal direction of the image screen at a predetermined angle, and a second lenticular lens sheet having a second lenticular direction that is orthogonal to the first lenticular direction of the first lenticular lens sheet.

7. The projection type autostereoscopic system of claim 4, wherein the image screen comprises a first lenticular lens sheet with lenticular lenses having a lenticular direction that is slanted with respect to the vertical direction of the image screen at a predetermined angle, a second lenticular lens sheet having the same lenticular direction as the first lenticular lens sheet, and a diffuser layer disposed between the first and second lenticular lens sheets.

8. The projection type autostereoscopic system of claim 7, wherein a vertical arrangement of viewing zones created by the at least three parts of the frame is transformed into a horizontal arrangement of viewing zones by the following equation:

$$\tan\varphi = \frac{d}{H}$$

where (d) represents a distance between the horizontal arrangement of the viewing zones, ($\varphi$) represents an angle between the lenticular direction and the vertical direction of the image screen, and (H) represents a distance between the first and second parallel plane mirrors.

9. The projection type autostereoscopic system of claim 7, wherein the diffuser layer is placed at double focal distances of the first and second lenticular lens sheets.

10. The projection type autostereoscopic system of claim 4, wherein a distance (H) between the first and second parallel plane mirrors, a distance (L) between the image projector and the image screen, and a vertical projection angle ($\rho$) of the image projector satisfies the following relationship to create (2m+1) viewing zones where m is equal to any positive integer $$\frac{(2m+1)}{2}\frac{H}{L} = \tan\rho.$$

11. The projection type autostereoscopic system of claim 1, wherein the image screen comprises at least one Fresnel lens.

12. The projection type autostereoscopic system of claim 1, wherein the image screen comprises at least one Fresnel lens and a diffuser arranged with the at least one Fresnel lens.

13. The projection type autostereoscopic system of claim 12, wherein the diffuser comprises an elliptical light shaping diffuser.

14. The projection type autostereoscopic system of claim 12, wherein a wide light scattering axis of the diffuser is slanted with respect to a vertical direction of the image screen at a predetermined angle.

15. An autostereoscopic projection system, comprising:
a screen;
an image projector to simultaneously project at least three perspective views constituting a frame arranged in a direction; and
a mirror unit having first and second plane mirrors disposed between the screen and the image projector to be in parallel to a projection axis and to directly and reflectively project the at least three perspective views according to a location of each of the at least three perspective views with respect to a center of the frame.

16. An autostereoscopic projection system, comprising:
a screen;
an image projector to project first, second, and third perspective views of a frame; and
a mirror unit having first and second plane mirrors fixedly disposed between the screen and the image projector to be in parallel to a projection axis and to simultaneously direct all of the first, second, and third perspective views toward the screen.

17. An autostereoscopic projection system, comprising:
a screen;
an image projector to project a plurality of partial beams of an image toward the screen;
a first reflector and a second reflector disposed in parallel with each other and a projection axis and extending between the image projector and the screen to reflect the plurality of partial beams of the image to the screen to create a plurality of corresponding viewing zones at which the image is viewable in three dimensions.

18. The system of claim 17, wherein the plurality of partial beams comprise first, second, and third beams, and the first beam is emitted directly to the screen without being reflected by the first and second reflectors while the second and third beams are emitted to the screen and are each reflected at least once by the first and second reflectors.

19. The system of claim 18, wherein the plurality of partial beams further comprise fourth and fifth beams, and the fourth and fifth beams are emitted to the screen and are each reflected at least twice by the first and second reflectors.

20. The system of claim 17, wherein the screen is a pupil forming screen comprising a layer and each of the plurality of partial beams of the image forms a corresponding viewing zone through the layer.

21. The system of claim 20, wherein the layer comprises one of the following:
at least one Fresnel lens; and
at least one directional diffuser disposed on at least one Fresnel lens.

22. The system of claim 20, wherein the layer comprises one of the following:
at least one lenticular lens sheet; and
at least one diffuse layer disposed on at least one lenticular lens sheet.

23. The system of claim 20, wherein the layer comprises a first lenticular lens sheet having lenticular lenses disposed along a first direction and a second lenticular lens sheet having lenticular lenses disposed along a second direction.

24. The system of claim 23, wherein the first direction is perpendicular to the second direction or the lenticular lens sheets are contocal.

25. The system of claim 20, wherein the layer expands the plurality of viewing zones such that the plurality of viewing zones border each other but do not crosstalk with each other.

26. The system of claim 17, wherein the first and second reflectors create at least two virtual projectors by reflecting the plurality of partial beams of the image.

27. The system of claim 17, wherein the image projector receives an image signal having at least one frame with a plurality of frame portions that correspond to the plurality of partial beams of the image and the plurality of viewing zones.

28. The system of claim 27, wherein the plurality of frame portions each includes a different perspective view of a three-dimensional object.

29. The system of claim 17, wherein the screen, the image projector, and the first and second reflectors are arranged according to the following equation:

$$\frac{3}{2}\left(\frac{W}{L}\right) = \tan\vartheta$$

where (W) represents a distance between the first and second reflectors, (L) represents a projection distance between the image projector and the screen, and (θ) represents a projection angle of the image projector.

30. The system of claim 17, wherein the plurality of viewing zones extend across an area that is wider than the screen.

31. The system of claim 17, wherein the screen comprises a layer, and a plurality of positions of the plurality of viewing zones is controlled by the first and second reflectors and the layer.

32. The system of claim 17, wherein the plurality of partial beams of the image each comprise a different perspective view of the image such that the different perspective views of the image are viewable at the corresponding viewing zones.

33. The system of claim 17, wherein the plurality of viewing zones are formed along a first orthogonal axis by reflections from the first and second reflectors, and the screen comprises one or more optical elements to transform the plurality of viewing zones to be arranged along a second orthogonal axis such that the plurality of viewing zones are arranged in two dimensions.

34. The system of claim 17, wherein the plurality of viewing zones are linearly arranged according to the following equation:

$$d = \frac{W}{\left(\frac{L}{F}\right) - 1}$$

where (d) represents a desired distance between the plurality of viewing zones, (W) represents a distance between the first and second reflectors, (L) represents a projection distance between the image projector and the screen, and (F) represents a focal length of a lens of the screen.

35. The system of claim 17, wherein the plurality of viewing zones formed by the first and second reflectors can be expanded according to the following equation:

$$w = \frac{D}{\left(\frac{L}{F}\right) - 1}$$

where (w) represents an expanded viewing zone size, (D) represents a size of an opening of a projection lens, (L) represents a projection distance between the image projector and the screen, and (F) represents a focal length of the lens of the screen.

36. The system of claim 17, wherein the screen comprises a predetermined combination of lenticular lenses to expand and shift the plurality of viewing zones formed by the first and second reflectors.

37. The system of claim 17, wherein the plurality of viewing zones are arranged according to the following equation:

$$\frac{2n+1}{2}\frac{W}{L} = \tan\vartheta$$

where (2n+1) represents a desired number of viewing zones, (W) represents a distance between the first and second reflectors, (L) represents a projection distance between the image projector and the screen, and (θ) represents a projection angle of the plurality of beams emitted from the image projector.

38. The system of claim 17, wherein the image projector receives an image frame comprising at least a first part, a second part, and a third part as perspective views and projects the perspective views along the first and second reflectors to form at least a central viewing zone, a first viewing zone, and a second viewing zone.

39. The system of claim 38, wherein the first part, the second part, and the third part are equal to each other.

40. The system of claim 17, wherein the plurality of viewing zones are arranged vertically by the first and second reflectors, and the screen comprises a directional light diffuser to slant the vertical arrangements of the plurality of viewing zones according to the following equation:

$$\tan\varphi = \frac{dH}{\left(\frac{L}{F}\right) - 1}$$

where (φ) represents an angle at which the vertical arrangement of the plurality of viewing zones is slanted, (d) represents a desired horizontal viewing zone distance of the slanted vertical arrangement of the plurality of viewing zones, (H) represents a distance between the first and second reflectors, (L) represents a projection distance between the image projector and the screen, and (F) represents a focal length of the a lens of the screen.

41. The system of claim 17, wherein the screen transforms the plurality of viewing zones formed by the first and second reflectors into a plurality of stereoscopic vision areas formed continuously with respect to each other.

42. An autostereoscopic projection system, comprising:
an image projector to project at least two partial beams corresponding to at least two perspective views of an image toward a screen; and
a first reflector and a second reflector disposed in parallel with each other and a projection axis of the image projector,
wherein the first and second reflector extend between the image projector and the screen to reflect the at least two partial beams to the screen to create a plurality of corresponding viewing zones such that the image is viewable in three dimensions.

* * * * *